United States Patent [19]
Nozaki

[11] Patent Number: 5,864,053
[45] Date of Patent: Jan. 26, 1999

[54] SUSPENSION ROLLING TESTER

[75] Inventor: Hiromichi Nozaki, Tokyo, Japan

[73] Assignee: Nissan Altia Co., Ltd., Tokyo, Japan

[21] Appl. No.: 845,080

[22] Filed: Apr. 18, 1997

[30] Foreign Application Priority Data

Apr. 26, 1996 [JP] Japan .................................. 8-130741

[51] Int. Cl.$^6$ .................................................. G01B 5/24
[52] U.S. Cl. .............................. 73/11.07; 33/288; 33/336
[58] Field of Search .............................. 73/11.04, 11.07, 73/11.08, 669; 33/203.18, 288, 336

[56] References Cited

U.S. PATENT DOCUMENTS

| | | | |
|---|---|---|---|
| 3,689,161 | 9/1972 | Lill et al. ................................... | 33/288 |
| 4,679,327 | 7/1987 | Fouchey et al. ........................... | 33/288 |
| 4,862,736 | 9/1989 | Treitz ....................................... | 73/117 |
| 5,040,303 | 8/1991 | Koerner .................................... | 33/288 |
| 5,111,585 | 5/1992 | Kawashima et al. ...................... | 33/288 |
| 5,259,246 | 11/1993 | Stuyts ....................................... | 73/669 |
| 5,574,226 | 11/1996 | Reuther et al. ............................ | 73/669 |
| 5,604,296 | 2/1997 | Nozaki ...................................... | 33/336 |
| 5,723,782 | 3/1998 | Bolles, Jr. ................................. | 73/146 |

*Primary Examiner*—Ronald L. Biegel
*Assistant Examiner*—Eric S. McCall
*Attorney, Agent, or Firm*—Flynn, Thiel, Boutell & Tanis, P.C.

[57] ABSTRACT

A suspension rolling tester is provided for measuring the movement of suspensions of wheels to be measured vehicle when the vehicle is rolled. The suspension rolling tester includes a roll input device and measuring devices, wherein the roll input device guides rear wheels or front wheels not to be measured of the vehicle to be measured in the non-restriction state, the measuring devices guide front wheels or rear wheels to be measured which are opposite to the wheels not to be measured, wherein the roll input device applies a rolling force to the rear wheels or front wheels not to be measured, and the measuring devices detect suspension data of the wheels to be measured when the rear wheels or front wheels not to be measured are rolled.

19 Claims, 16 Drawing Sheets

ROLLED RIGHTWARD

ROLLED LEFTWARD

ROLLED RIGHTWARD

ROLLED LEFTWARD

SUSPENSION ROLLING TESTER

BACKGROUND OF THE INVENTION

1. Field of the Invention

This invention relates to a suspension rolling tester for measuring the movement of suspensions of a vehicle when the vehicle is rolled.

2. Prior Art

In a vehicle such as an automobile, when it travels to the right or left, namely, when it corners, there occurs rolling in the vehicle which is different from a direct traveling thereof.

If such rolling occurs, a ratio of load movement of the right and left wheels is largely differentiated between the front and rear wheels owing to the difference of a spring constant in the suspensions of the coil springs of the front and rear wheels of the vehicle. The load movement ratio exerts an influence upon steering characteristics (under steering or over steering of the vehicle). When the rolling occurs, an alignment characteristic of the wheels is also changed to vary the steeling characteristic.

Accordingly, the movement of the suspensions when the rolling occurs, namely, the load movement amount and the alignment variation amount between the inner and outer wheels, i.e. the right and left wheels are respectively measured and these amounts are required to be always kept in a good condition (normal state) so as to permit the vehicle to travel safely.

There have been proposed various testers as measuring devices for measuring the movement of the suspensions.

In the case of a conventional measuring device for measuring suspension characteristic, the vehicle to be measured is carried in or conveyed to a garage, then it is generally fixed by a fixing means, and a vertical movement is applied to the right and left wheels of the fixed vehicle by a roll input device composed of a driving means such as a hydraulic cylinder which is installed in a pit formed by digging the earth to substantially a deep length, thereby rolling the suspensions of the wheels, so as to realize a condition as if the vehicle were actually rolled. The movement of the suspensions has been thus detected based on the result of measurement.

SUMMARY OF THE INVENTION

Meanwhile, in the case of the conventional measuring device set forth above, since a rolling force is applied to the vehicle to be measured, the roll input device becomes normally very complex and very large. Accordingly, such measuring device costs high in manufacturing is, requires a large-sized pit formed by digging the earth to substantially the deep length, needs an embedding construction for embedding the pit, and also requires a large accommodating or installing space.

That is, the conventional device becomes very large scaled, which is suitable for a developing department of an automobile maker and a large garage but which is however not suitable for a small scaled garage.

In the small scaled garage, there is no room for accommodating such devices. In a system for firmly fixing the vehicle to be measured, it is quite troublesome to fix the vehicle and there is a possibility that the vehicle to be measured is liable to be damaged or deformed by the fixing means per se.

This invention has been made in view of such conventional problems, and it is an object of the invention to provide a suspension rolling tester, which is simple in structure can be manufactured at low cost, and wherein a vehicle to be measured is merely conveyed to a tester, and one pair of front or rear wheels are measured (e.g., front wheels) in a state where the vehicle is not restricted (free state) and the other wheels (e.g., rear wheels) are not measured, and an external force is applied to the wheels not to be measured by a simple device so as to roll the vehicle, so that the movement of the suspensions of the wheels to be measured can be measured.

That is, a suspension rolling tester of this invention includes a roll input device and measuring devices, wherein the roll input device guides rear wheels or front wheels not to be measured of a vehicle in a non-restricted state, the measuring devices guide front wheels or rear wheels to be measured which are opposite to the wheels not to be measured, and wherein the roll input device applies a rolling force to the rear wheels or front wheels not to be measured, and the measuring devices detect suspension data of the wheels when the vehicle to be measured is rolled.

DETAILED DESCRIPTION OF THE PREFERRED EMBODIMENTS

Figure 1:
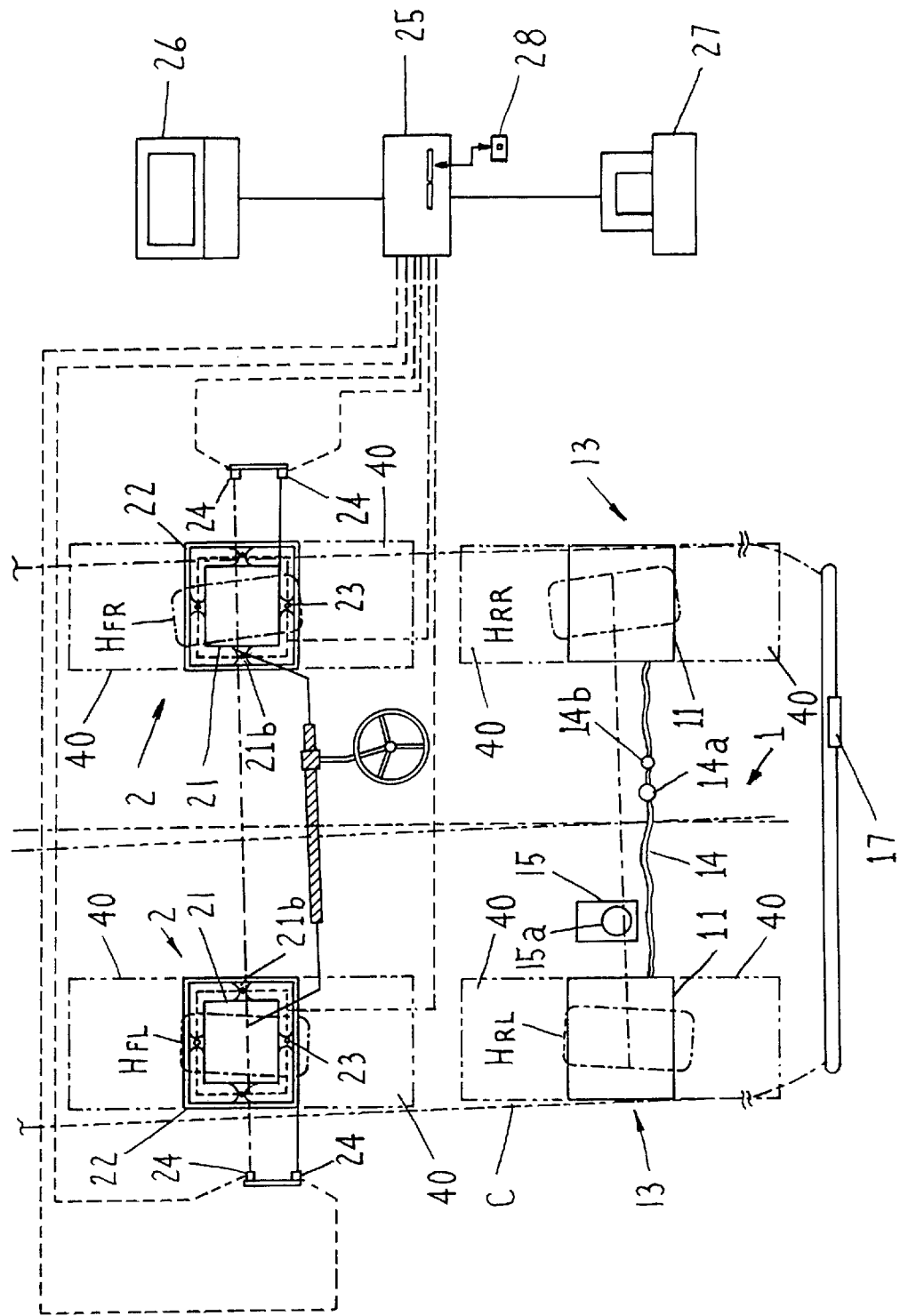
FIG. 1 is a plan view showing an entire suspension rolling tester according to this invention.
Figure 2:
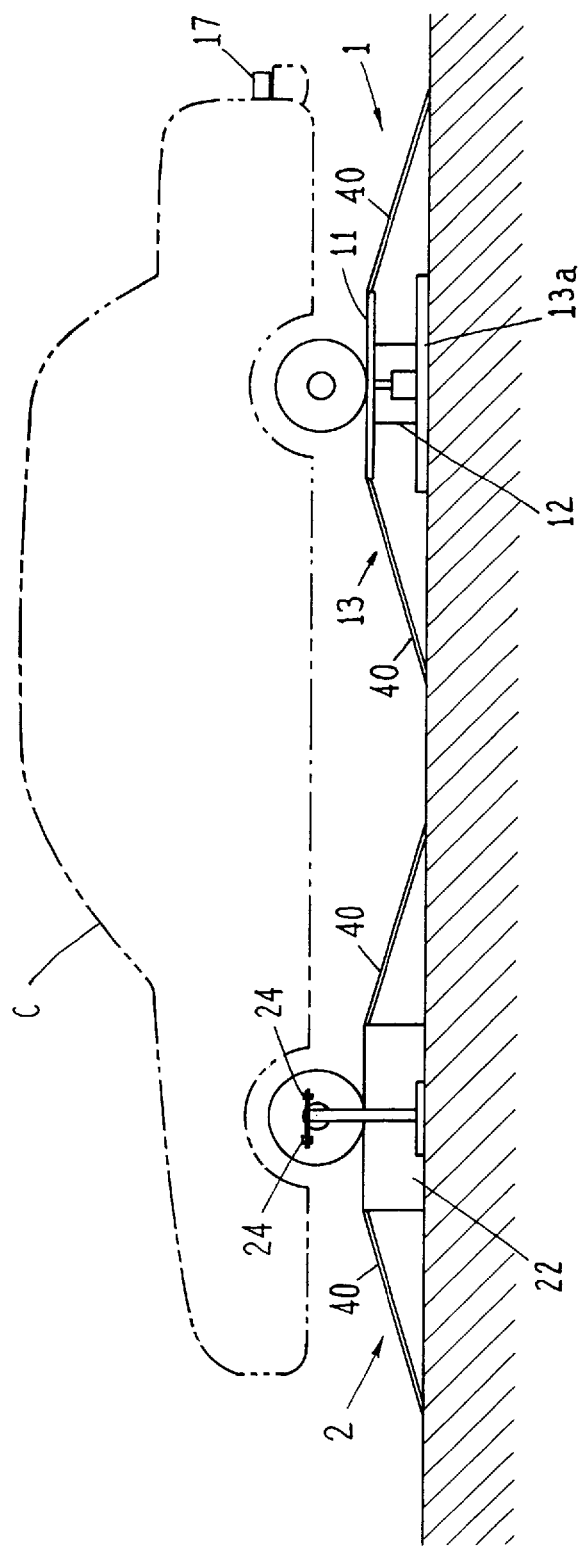
FIG. 2 is a side view of the suspension rolling tester of FIG. 1.
Figure 3:
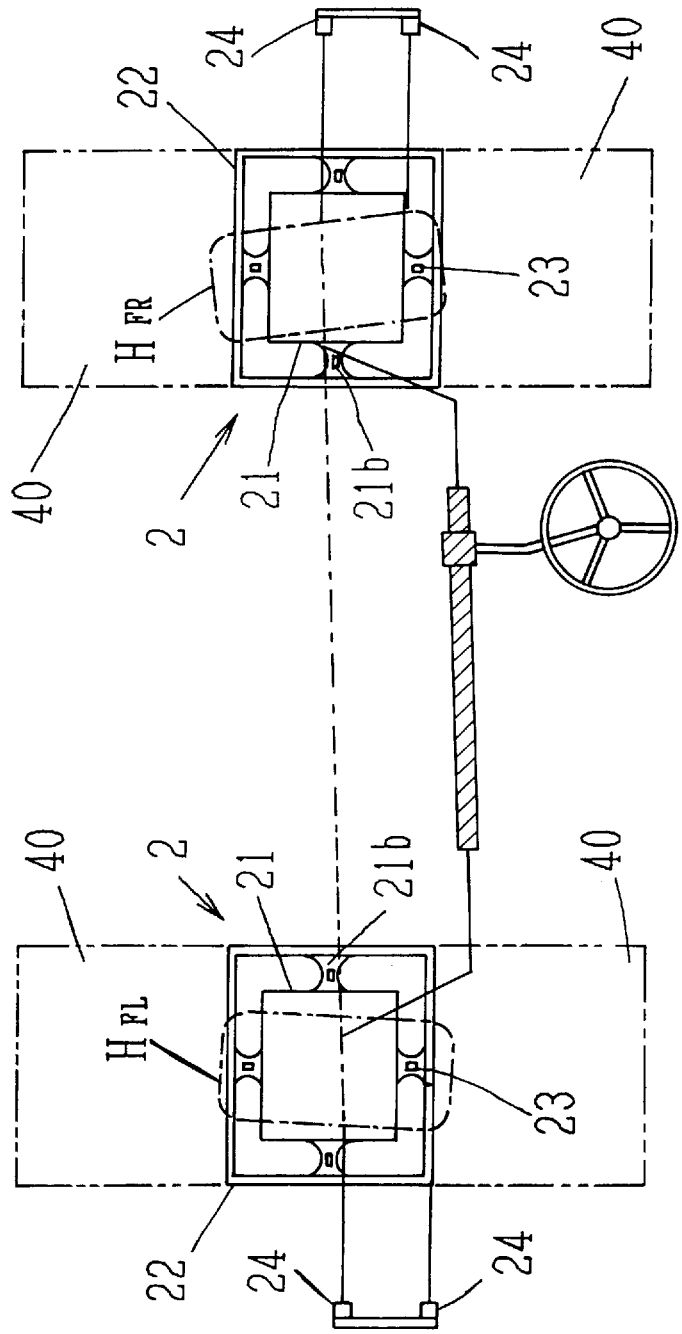
FIG. 3 is a view enlarging a part of the suspension rolling tester of FIG. 1.
Figure 4:
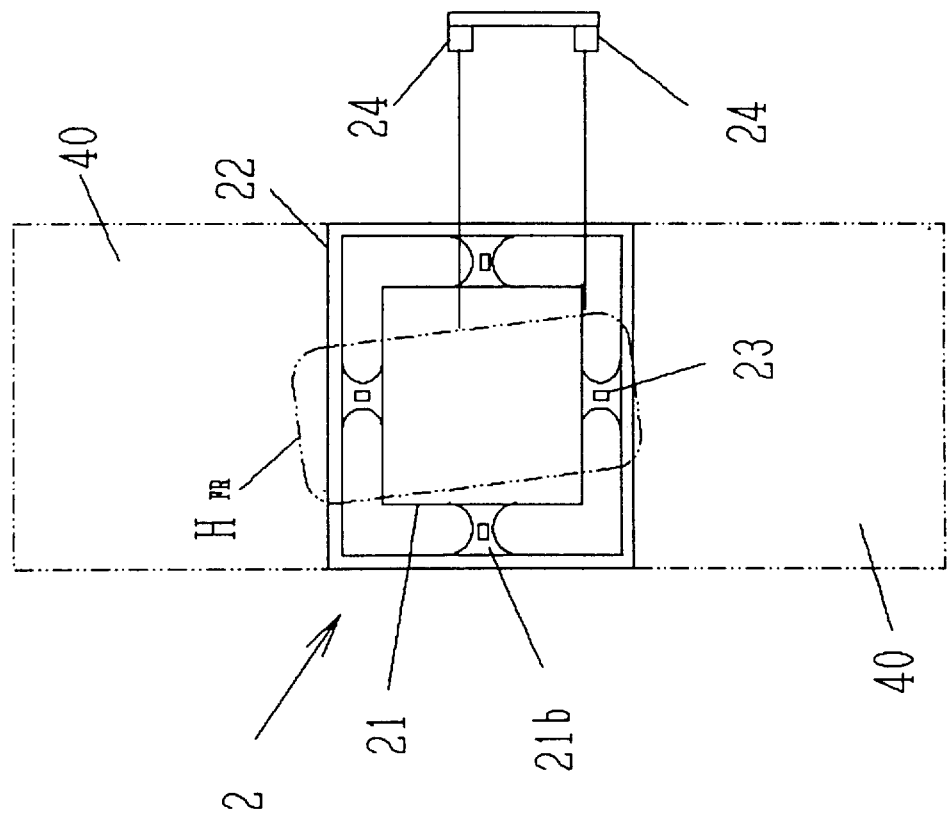
FIG. 4 is a view enlarging a part of the suspension rolling tester of FIG. 2.
Figure 8:
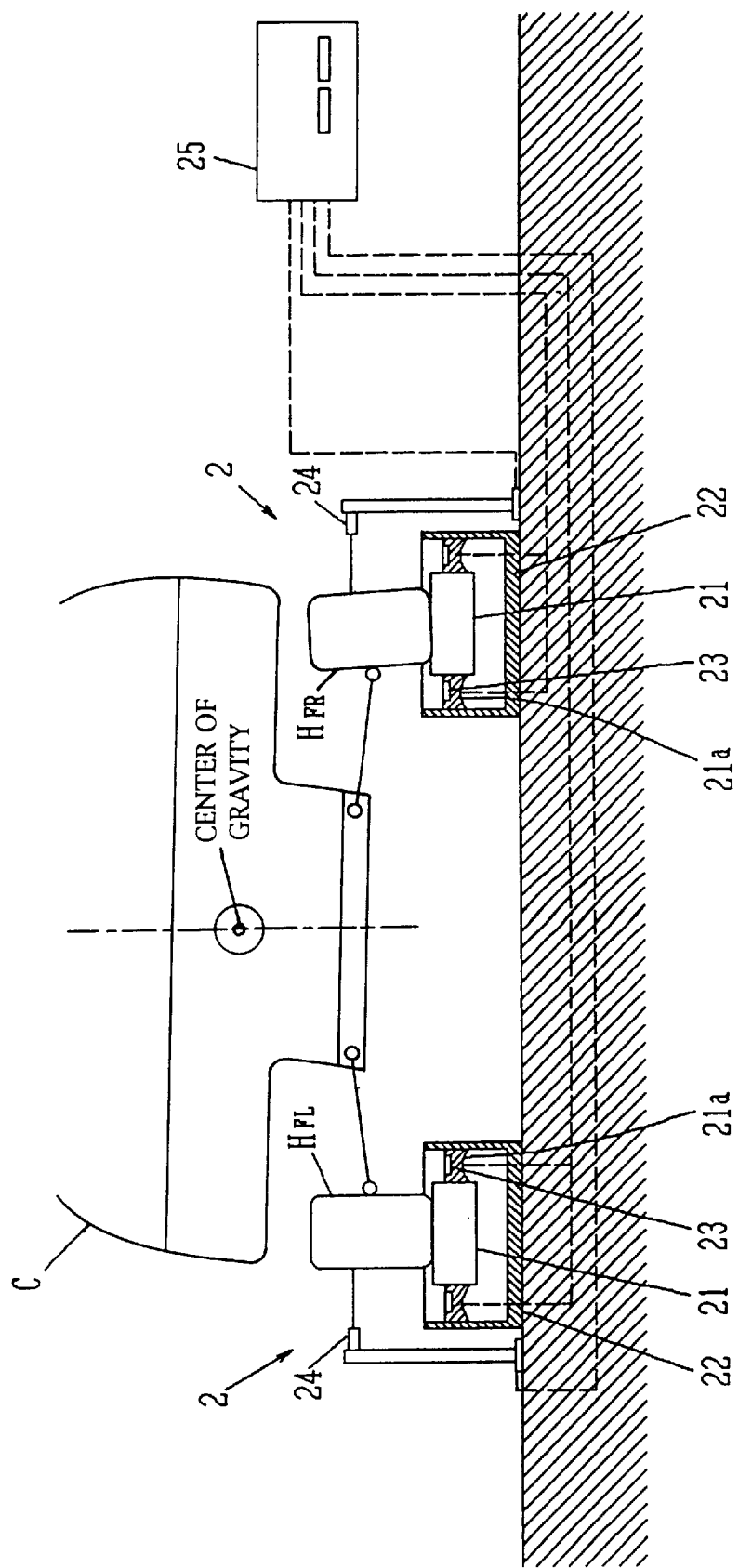
FIG. 8 is a longitudinal cross sectional view mainly showing a measuring device of the suspension rolling tester of this invention.

FIG. 1 is a plan view showing an entire structure of a suspension rolling tester of this invention, FIG. 2 is a side view of FIG. 1, FIGS. 3 and 4 are views enlarging a part of FIG. 1, FIGS. 5 through 7 are respectively longitudinal cross sectional views of a roll input device of the suspension rolling tester and views enlarging the part of the roll input device, and FIG. 8 is a longitudinal cross sectional view showing a part of the measuring device of the suspension rolling tester.

In these figures, denoted by 1 is a roll input device, 2 and 2 are measuring devices.

In this embodiment, a pair of front wheels $H_{FL}$ and $H_{FR}$ as wheels to be measured of a vehicle C to be measured are conveyed or guided to and placed on the measuring devices 2 and 2 while another pair of rear wheels $H_{RL}$ and $H_{RR}$ as wheels not to be measured are conveyed or guided to and placed on the roll input device 1. It is a matter of course that the pair of front wheels $H_{FL}$ and $H_{FR}$ may be the wheels not to be measured and the pair of rear wheels $H_{RL}$ and $H_{RR}$ may be the wheels to be measured, and in this case the direction of the conveyance or guidance of the vehicle C is opposite to that of the former case.

Figure 5:
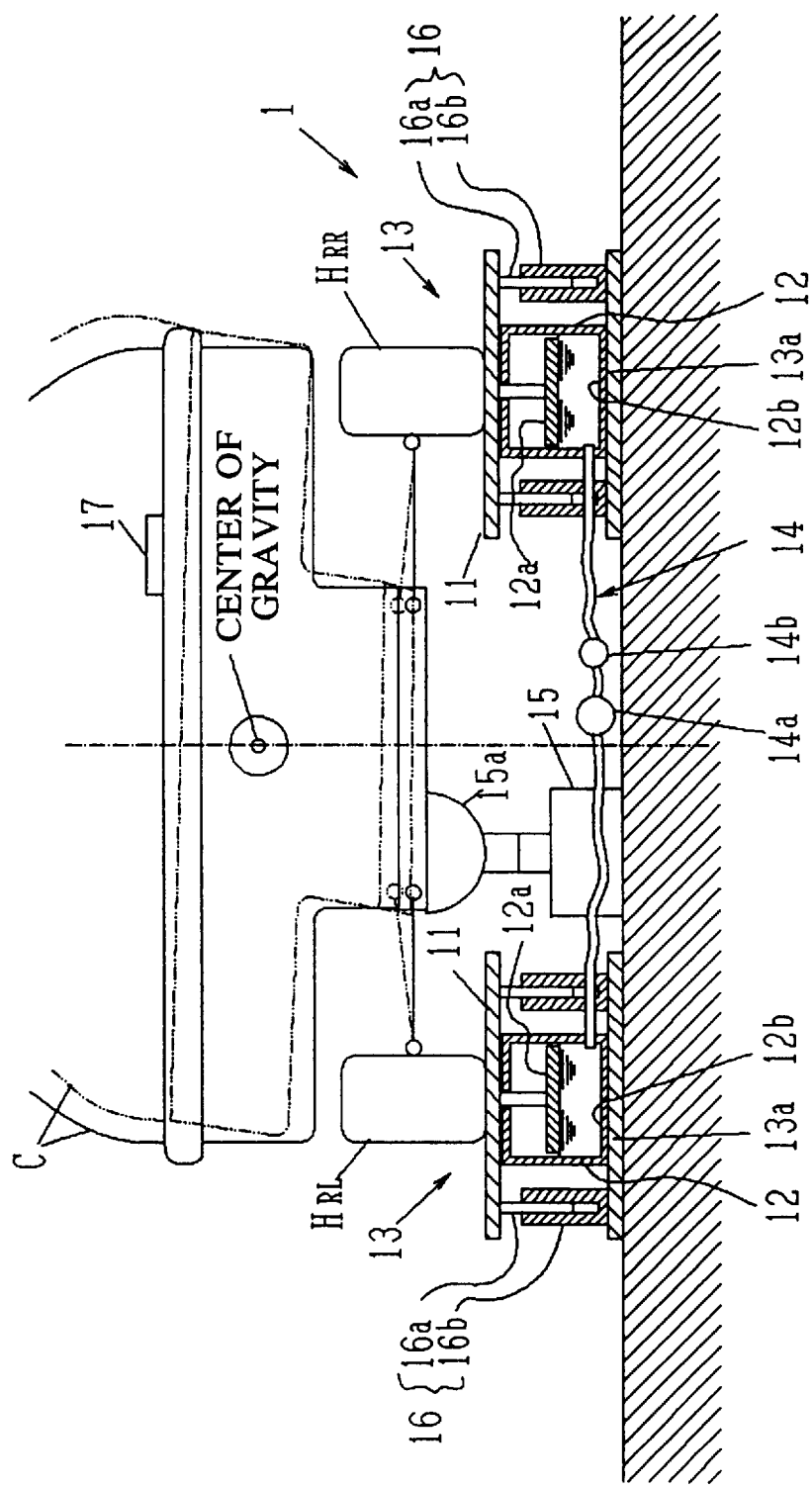
FIG. 5 is a longitudinal cross sectional view mainly showing a roll input device of the suspension rolling tester of this invention.
Figure 6:
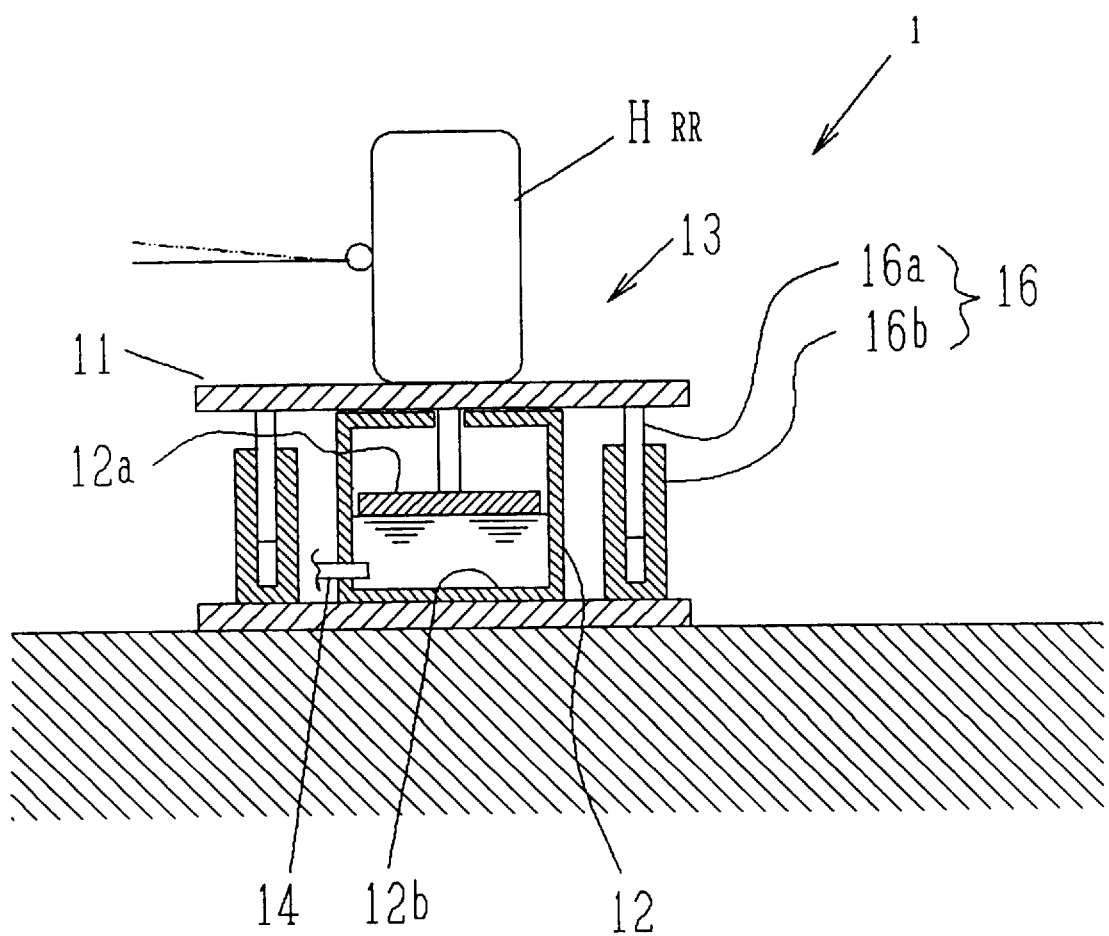
FIG. 6 is a view enlarging a right part of the roll input device of FIG. 5.
Figure 7:
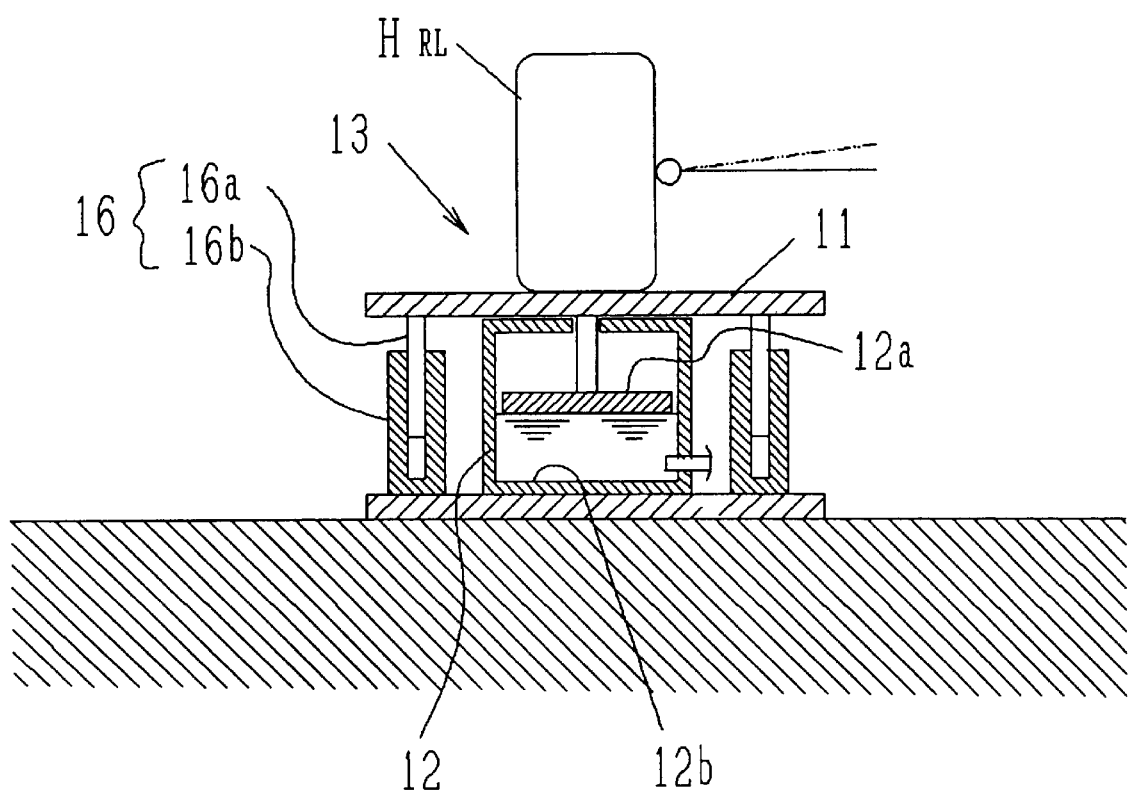
FIG. 7 is a view enlarging a left part of the roll input device of FIG. 5.

The roll input device 1 comprises, as illustrated principally in FIG. 5, a pair of simple structured elevating platforms 13 and 13, plate-shaped upper tables 11 and 11 on which the wheels not to be measured are placed, cylinder parts 12 and 12 of the elevating platforms 13 and 13 each having a piston part 12a for vertically moving the upper tables 11 and 11, an elevating platform control part 14 composed of a piping system including hoses or pipes for permitting fluid chambers 12b and 12b of the cylinder parts 12 and 12 of the elevating platforms 13 and 13 to communicate with each other, and a solenoid valve 14a and a throttle valve 14b which are provided on the elevating platform control part 14, if necessary, and a handy elevating means 15 composed of a jack (a garage jack, an air jack, or a simple cylinder) which is installed under a bottom (side sill) of the vehicle C so as to apply a rolling force to the wheels not to be measured. It is preferable to provide guide means 16 and 16 respectively composed of a guide pin 16a and a guide cylinder 16b for receiving the guide pin 16a between respective upper tables 11 and 11 and respective tables 13a and 13a of the platforms 13 and 13 so as to secure smooth elevation of the upper tables 11 and 11. There is also provided a track level or an angle sensor as an angle detecting means 17, which is disposed at an arbitrary position, e.g., on a rear bumper of the vehicle C for detecting a rolling angle (normally about 2°) of the vehicle C when the vehicle is rolled.

In the case where the roll input device 1 is directly installed on a floor of a garage as shown in FIG. 2, inclination boards 40 and 40 or inclination blocks may be provided in a direction where the vehicle C moves in or moves out from the garage.

According to the roll input device 1 shown in FIGS. 1, 2 and 5, the jack as the elevating means 15 is installed in the garage and is appropriately positioned in a biased manner under one of the link pivots provided on the bottom of the vehicle after the vehicle C is conveyed to the garage, so that the vehicle C is inclined as shown by broken lines in FIG. 5 when an elevating part 15a of the elevating means 15 is raised or lowered.

At this time, the right rear wheel $H_{RR}$ presses the upper table 11 downward so that fluid in the fluid chamber 12b of the cylinder part 12 moves to the fluid chamber 12b of the cylinder part 12 of the opposite side by way of the piping system of the elevating platform control part 14 for pushing the piston part 12a of the cylinder part 12 of the opposite side. As a result, the upper table 11 of the opposite side connected to the piston part 12a is pushed up, thereby raising the left rear wheel $H_{RL}$.

Before operating the garage jack, the solenoid valve 14a and the throttle valve 14b of the elevating platform control part 14 are opened. The rolling of the vehicle by the garage jack is less frequently performed while the solenoid valve 14a is closed and the throttle valve 14b is throttled in a state where the throttle valve 14b is slightly opened (in an orifice state). In this state, the garage jack is removed under the vehicle so as to intermittently open or close the solenoid valve 14a so that the fluid is permitted to flow from the throttle valve 14b little by little to regulate the rolling angle to a prescribed value (normally about 2°).

As a result, the rolling state of the vehicle C is realized. That is, the rolling state can be simply and quickly realized by merely operating the garage jack or operating the solenoid valve 14a and the throttle valve 14b. The rolling angle at this time can be read by the angle detector 17.

Meanwhile, the measuring devices 2 and 2 are disposed at positions corresponding to a pair of front wheels $H_{FL}$ and $H_{FR}$ of the vehicle C as is evident from FIG. 8, and they include tables 21 and 21 on which the pair of front wheels $H_{FL}$ and $H_{FR}$ are placed and frame bodies 22 and 22 for accommodating the placing tables 21 and 21 therein, and wheel load meters 23 and 23 which are installed at beam parts (bending parts) 21a for supporting the placing tables 21 and 21 and are composed of a load cell such as a strain gage for measuring the wheel load.

Further, there are provided a plurality of alignment variation measuring parts 24 and 24 composed of wired type displacement sensors (or non-contact type distance sensors, for example, laser displacement sensors and supersonic wave sensors) outside the pair of front wheels $H_{FL}$ and $H_{FR}$ for measuring the variation of the alignment of the wheels to be measured.

When the measuring devices 2 and 2 are directly installed on the floor of the garage as shown in FIG. 2, the inclination boards 40 and 40 or inclination blocks may be provided in a direction where the vehicle C moves in or moves out from the garage.

The measured data from the wheel load meters 23 and 23 and the alignment variation measuring parts 24 and 24 are respectively inputted into an arithmetic operation device 25 (for example a computer) so that the arithmetic operation device 25 can perform various operations, and a result of operation can be displayed on a display 26 such as a CRT. The result of operation can be outputted by an output device 27 such as a printer, or it is stored in a storage medium 28 such as a floppy disk which is inserted into or out from a drive device attached to the arithmetic operation device 25. Data detected by an angle sensor such as the angle detector 17 can be also directly inputted into the arithmetic operation device 25.

In the case of the wheel load meters 23 and 23, the output data therefrom can be detected as the wheel load as it is. In the case of measuring the variation of alignment of the wheels to be measured by the alignment variation measuring parts 24 and 24, it is required to be devised or calculated to some extent.

First in the case of the wired type displacement sensor, an attachment holder 31 for detecting the displacement of the wheel is attached to the wheel, and a wire 24a of the alignment variation measuring part 24 is brought into contact with the attachment holder 31. The attachment holder 31 comprises a metal member 31a having, e.g., a frame groove, a metal slide member 31b which is slidably accommodated in the frame groove, a lock part 31c for fixing the metal slide member 31b at an appropriate position, and clamping pieces 31d and 31d which are respectively fixed to the free end of the metal member 31a and the free end of the metal slide member 31b and are brought into contact with an outer periphery of the wheel. When the wire 24a is brought into contact with the attachment holder 31, a magnet part 24b is provided on the tip end of the wire 24a so as to be magnetically attracted by the clamping pieces 31d and 31d. Alternatively, the wire 24a is caught by a hook which is provided on the metal member 31a or metal slide member 31b.

Figure 11:
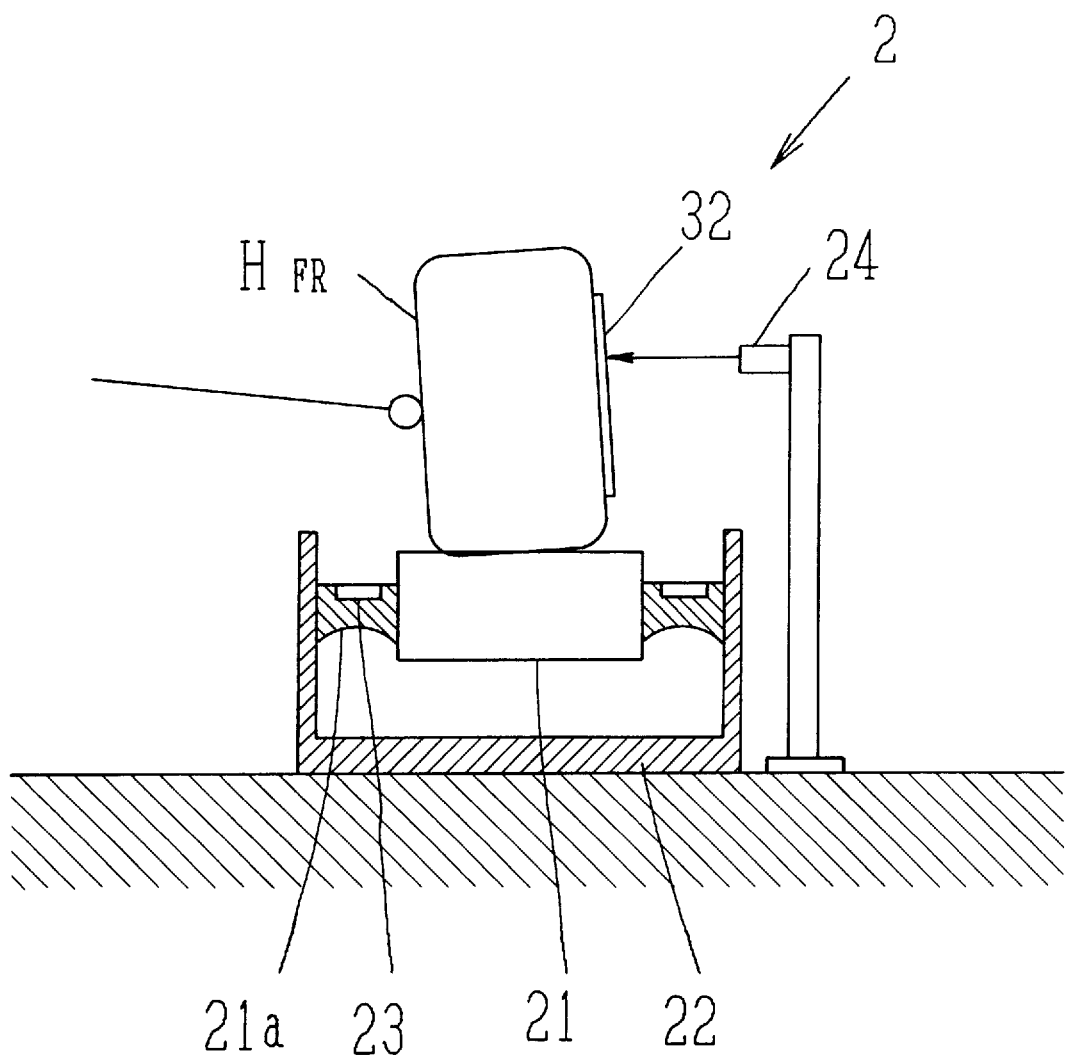
FIG. 11 is a longitudinal cross sectional view enlarging a part of another measuring device at the right front wheel as viewed from the rear part of the vehicle.

In the case of employment of the laser displacement sensor as a distance sensor, an attachment plate 32 for measuring the displacement of the alignment which is excellent in reflective characteristic is provided on the side of the wheel to be measured as shown in FIG. 11 so that the laser beam directed at the wheel to be measured can be reflected in good condition. In the case of employment of the supersonic wave sensor as the distance sensor, it is not necessary to provide the attachment plate 32 because the reflection of the supersonic waves from the wheel per se can be obtained in good condition.

When the roll input device 1 is installed, the height of the roll input device 1 in the longitudinal direction can be minimized because the rolling angle is about 2° at which the rolling force is applied to the vehicle, and a large elevating stroke is not required. Accordingly, the vehicle C can easily get on the upper tables 11 and 11 by the employment of the inclination boards 40 and 40. In the case of embedding the pit P in the floor of the garage, the floor or earth can be dug shallow, thereby saving the embedding cost.

This is also applied to the measuring devices 2 and 2, and the structure of each measuring device 2 is more simplified so that the height thereof in the longitudinal direction can be minimized. Even in the case of embedding the measuring devices 2 and 2 in the pit of the garage, the pit P may be shallow.

In the suspension rolling tester of this invention having such an arrangement, the measurement of the movement of the suspensions at the rolling time, namely, the measurement of the load movement amount and the alignment variation amount between the inner and outer wheels can be performed as follows.

The vehicle C is first conveyed to the testing part, and the pair of front wheels $H_{FL}$ and $H_{FR}$ to be measured are placed on the measuring devices 2 and 2 while the pair of rear wheels $H_{RL}$ and $H_{RR}$ not to be measured are placed on the roll input device 1 as shown in FIG. 1 in a state where the vehicle C is not fixed to the testing part, namely in a non-restricted state (free state).

Thereafter, the garage jack of the elevating means 15 of the roll input device 1 is operated or driven in the free state of the vehicle C so as to apply the rolling force to the wheels not to be measured as shown in the broken lines in FIG. 5, (i.e. the rear wheels and vehicle body are rotated about the longitudinal axis of the vehicle) and thereafter the garage jack is removed. As a result, the right rear wheel $H_{RR}$ lowers but the left rear wheel $H_{RL}$ rises so that the rolling occurs easily at the rear side of the vehicle C. At this time, the height of the vehicle C is varied at the pair of rear wheels $H_{RL}$ and $H_{RR}$ respectively contacting the earth or the upper table, so as to realize a state of the cornering operation during the traveling of the vehicle C.

Since the rolling is performed in a state where the vehicle C is not fixed but in a non-restricted state (free state) where it is merely conveyed to the garage, the invention dispenses with the fixing operation. Further, since there is no fixing means, the vehicle C is neither damaged unnecessarily nor deformed at all.

When the rolling occurs at the rear side of the vehicle C in such a manner, this rolling is transmitted to the pair of front wheels $H_{FL}$ and $H_{FR}$ to be measured, wherein the downward pressing force is applied to the right front wheel $H_{FR}$ so that the right front wheel $H_{FR}$ is liable to lower while the upward pressing force is applied to the left front wheel $H_{FL}$ so that the left front wheel $H_{FL}$ is liable to rise.

Accordingly, the wheel load of the wheels to be measured is measured by the wheel load meters 23 and 23 and the variation of alignment of the wheels is measured by the alignment variation measuring parts 24 and 24, and the resultant measured data is inputted into the arithmetic operation device 25 so that the arithmetic operation device 25 can perform a given arithmetic operation.

For example, the increment or decrement of the load applied to each wheel is calculated by measuring the load of wheels to be measured based on which a roll rigidity, a sharing ratio of the roll rigidity and a sharing ratio of the load movement are respectively calculated. It is possible to calculate a toe angle and a camber angle of the wheels to be measured, and also possible to calculate a roll steering ratio of each wheel based on the toe angle.

Based on the values set forth above, defects of balance of the roll rigidity and the dynamic alignment can be accurately detected.

Figure 12:
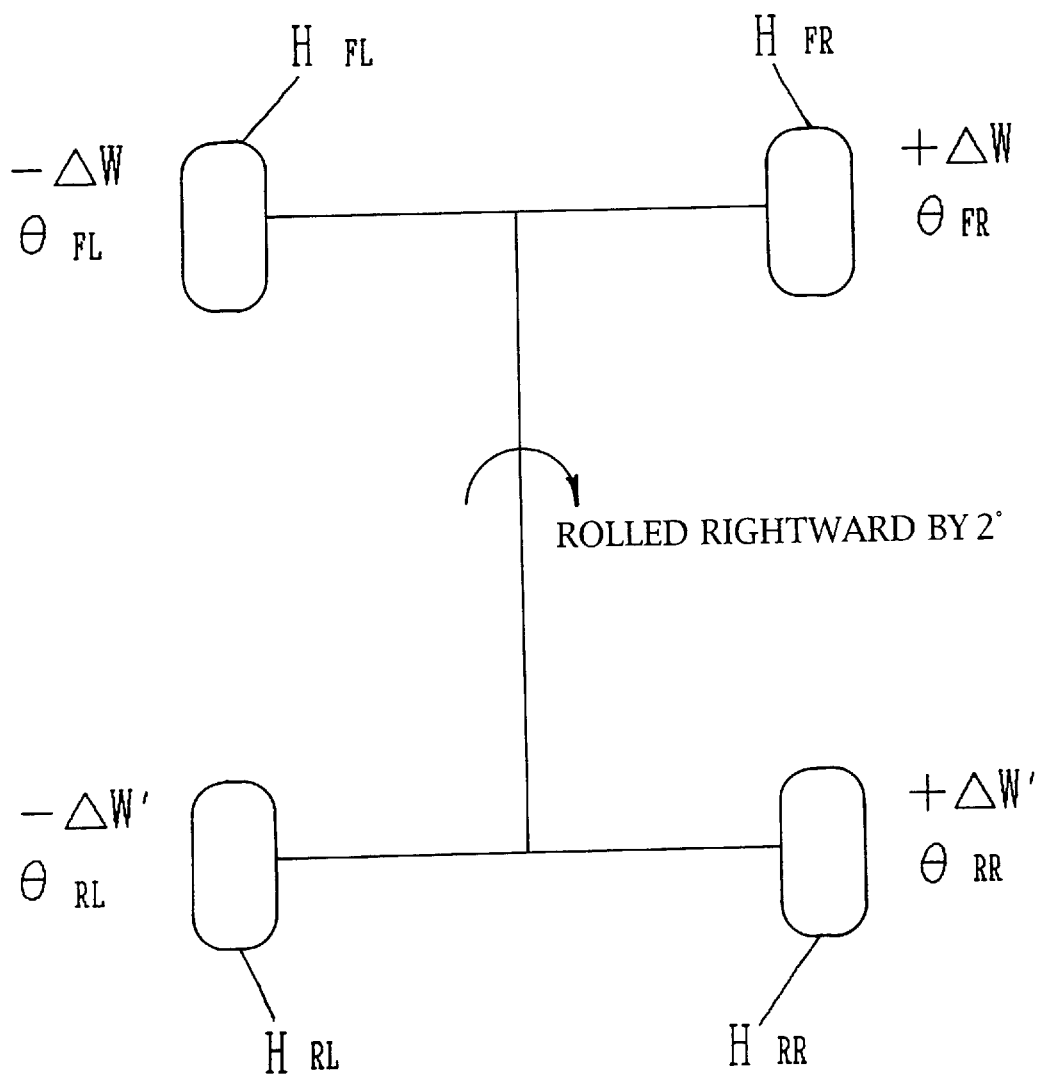
FIG. 12 is a schematic view showing a state of measurement of wheels according to the suspension rolling tester of the invention.

For example, when the front wheels are rolled rightward by 2° as shown in FIG. 12, a front roll rigidity $K_F$ of the pair of front wheels $H_{FL}$ and $H_{FR}$ can be calculated from the following expression (1).

$$K_F = [+\Delta W - (-\Delta W)] \times (T_F/2)/\phi \tag{1}$$

where $+\Delta W$ is an increment of the load of the right front wheel $H_{FR}$, $-\Delta W$ is a decrement of the load of the left front wheel $H_{FL}$, $T_F$ is a front tread, i.e. the distance between the pair or front wheels at the center thereof, $\phi$ is a roll angle (e.g., 2°). Likewise, a rear roll rigidity $K_R$ of the pair of rear wheels $H_{RL}$ and $H_{RR}$ can be calculated by the following expression (2).

$$K_R = [+\Delta W' - (-\Delta W')] \times (T_R/2)/\phi \tag{2}$$

where $+\Delta W'$ is an increment of the load of the right rear wheel $H_{RR}$, $-\Delta W'$ is a decrement of the load of the left rear wheel $H_{RL}$, $T_R$ is a rear tread, i.e. the distance between the pair or rear wheels at the center thereof, $\phi$ is a roll angle (e.g., 2°).

If the load rigidities $K_F$ and $K_R$ of the front and rear wheels are calculated, the total load rigidity becomes $K_F + K_R$. Accordingly, the front roll rigidity sharing ratio is calculated by the expression of $K_F/K_F + K_R$.

Likewise, the rear roll rigidity sharing ratio is calculated as the expression of $K_R/K_F + K_R$.

If the expression of $T_F \approx T_R$ is established in the vehicle C, the sharing ratio of the front roll rigidity relative to the rear roll rigidity ($K_F:K_R$) becomes substantially the same as a load movement sharing ratio between the front and rear wheels. Accordingly, when the load movement sharing ratio is calculated, it can correspond to the sharing ratio of the front roll rigidity relative to the rear roll rigidity ($K_F:K_R$).

As a result, it is possible to permit the front roll rigidity sharing ratio and the rear roll rigidity sharing ratio to correspond to the front load movement sharing ratio expressed by the front load movement amount/total load movement amount, and to the rear load movement rigidity sharing ratio expressed by the rear load movement amount/ total load movement amount.

Figure 9:
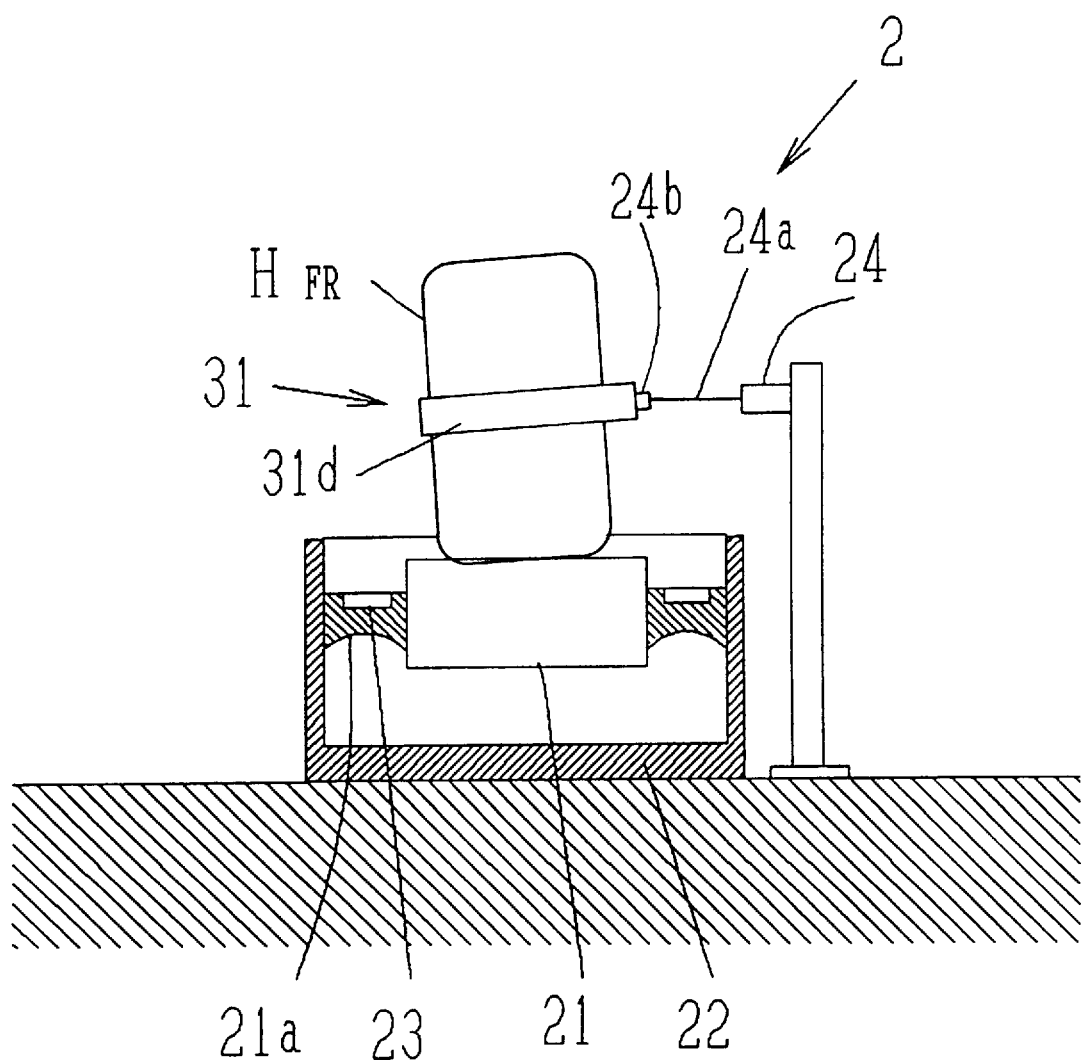
FIG. 9 is a longitudinal cross sectional view enlarging a part of the measuring device at the right front wheel as viewed from the rear part of the vehicle.
Figure 10:
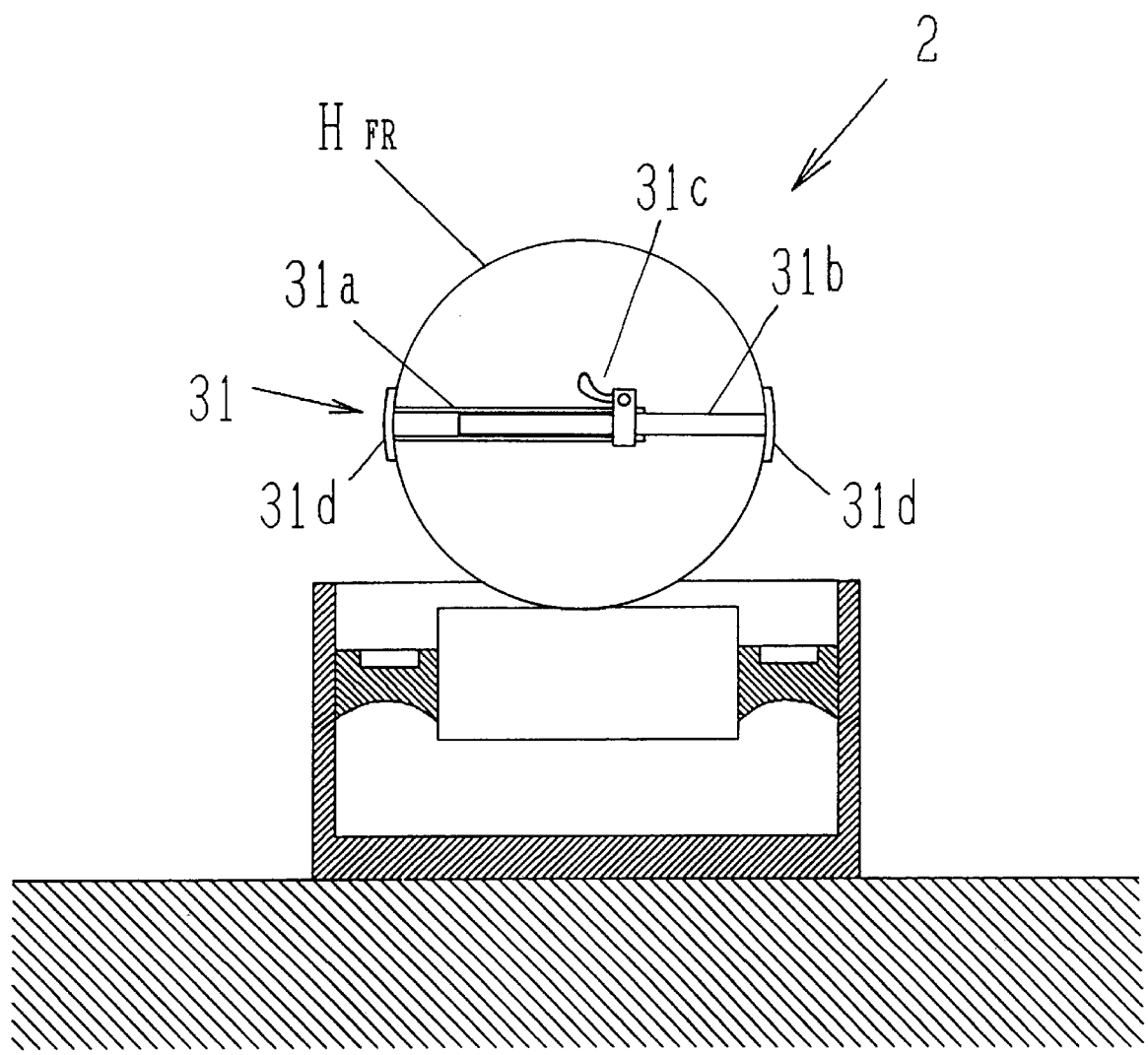
FIG. 10 is a longitudinal cross sectional view enlarging a part of the measuring device at the right front wheel as viewed from the outside direction of the vehicle.
Figure 13:
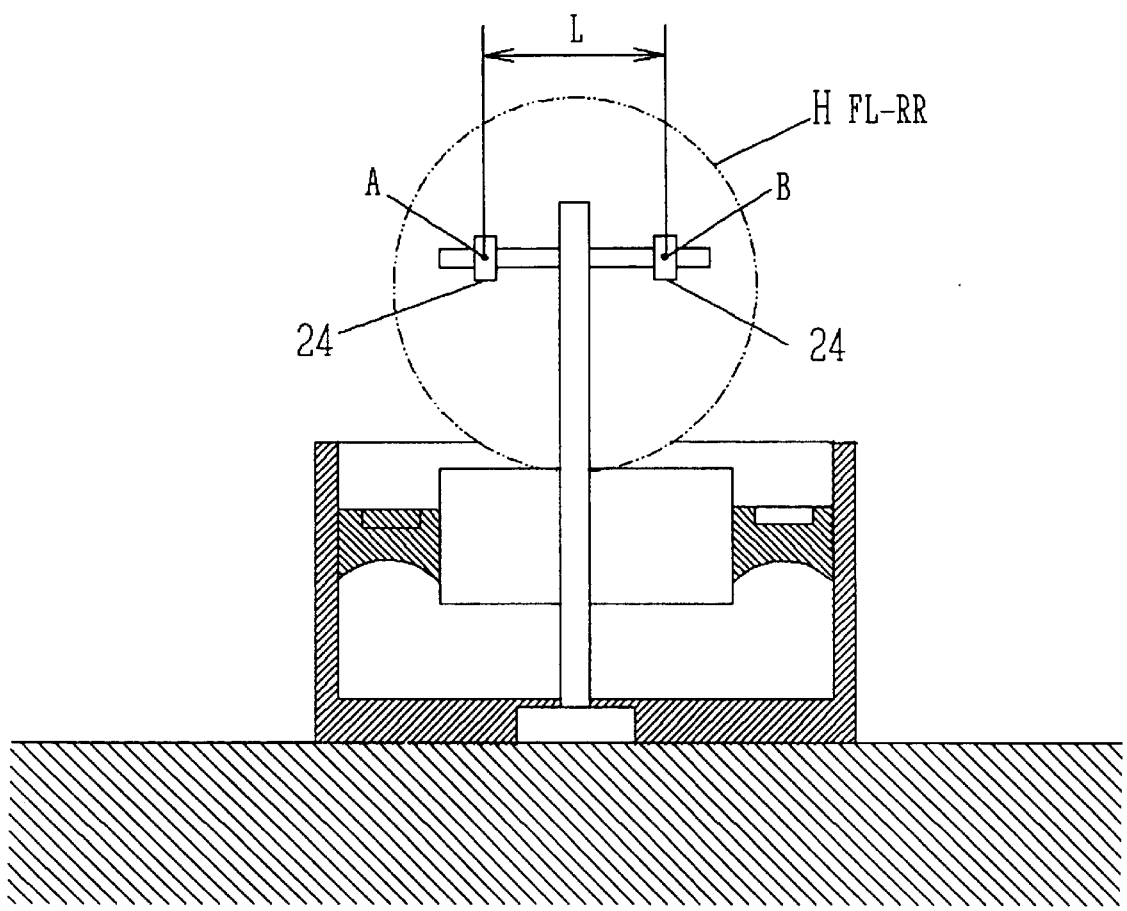
FIG. 13 is a schematic view explaining an example of alignment variation measuring parts according to the suspension rolling tester of the invention.

Next, the roll steering angle can be calculated by the variation of the toe angle when the vehicle is rolled. In the case of measuring the toe angle, alignment variation measuring parts 24 and 24, namely, two wired type displacement sensors 24 and 24 are positioned to confront each other at two points (points A and B) in the horizontal direction of the wheels to be measured as shown in FIGS. 1 and 13 and the wires 24a and 24a of the alignment variation measuring parts 24 and 24 are brought into contact with the attachment holders 31 and 31 as shown in FIG. 9. As a result, the toe angle $\theta_T$ is calculated by the following expression (3).

$$\theta_T = \tan^{-1}[(a-b)/L] \quad (3)$$

where a is a variation value at the point A, b is a variation value at the point B, L is a distance between two points (points A and B). If the variation of the toe angle is very small, it can be approximately calculated by the expression of $\theta_T \approx (a-b)/L$.

Figure 14:
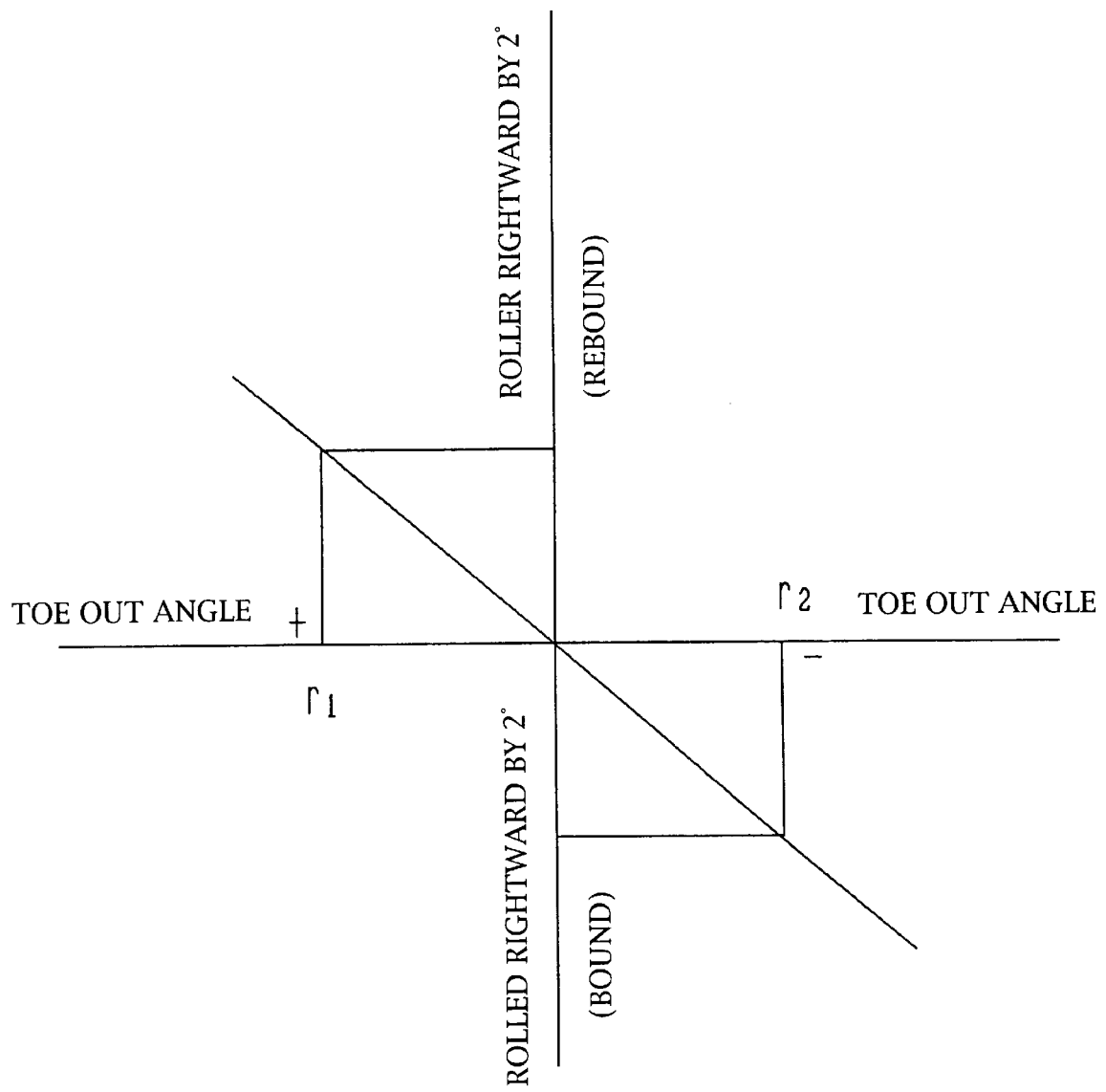
FIG. 14 is a schematic view for explaining the calculation of a roll steering angle.

In the case of the right front wheel $H_{FR}$, when the vehicle is rolled rightward or bound by 2°, it toes out so that the toe angle $\theta_T$ becomes $r_2$ as shown in FIG. 14. When the vehicle is rolled leftward or rebound by 2°, it toes in so that the toe angle $\theta_T$ becomes $r_1$. Accordingly, an average roll steering angle $\theta_{FR}$ of the right front wheel $H_{FR}$ is expressed as an average of the variation inclination of the values $r_1$ and $r_2$, namely, $[r_1-(-r_2)]/2$.

Accordingly, the roll steering ratio of the right front wheel $H_{FR}$ is calculated as follows by measuring the roll steering angle $\theta_{FR}$, namely, $(\theta_{FR}/2°) \times 100$ (%value).

If the same operation is carried out, the roll steering angles $\theta_{FL}$, $\theta_{RL}$, $\theta_{RR}$ of the other wheels $H_{FL}$, $H_{RL}$, $H_{RR}$ and the roll steering ratio are also calculated.

Accordingly, the following procedures may be taken in such a measuring method set forth above to obtain the necessary movement of the suspensions of the vehicle C.

Figure 15:
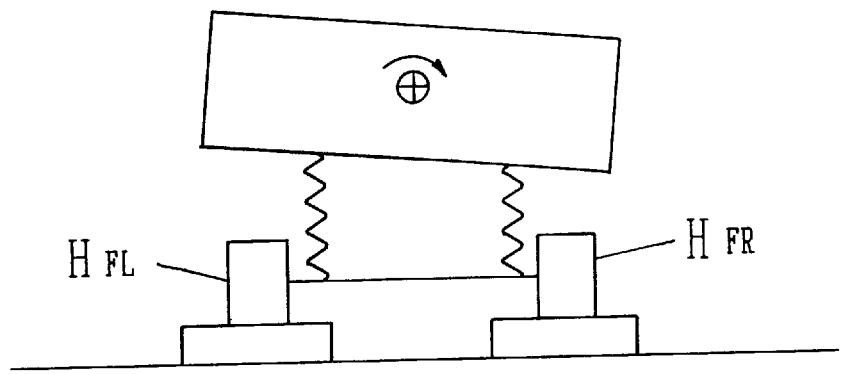
FIG. 15 is a schematic view for explaining a state where the front wheels of the vehicle to be measured are rolled rightward when using the suspension rolling tester.

(1) First, as for the front wheels, as shown in FIG. 15, the front roll rigidity $K_F$ of the front wheels is calculated when the vehicle is rolled rightward by rolling the vehicle by 2°.

Figure 16:
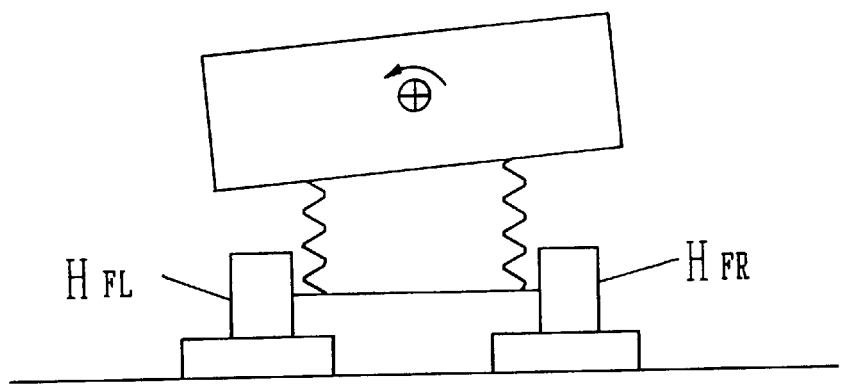
FIG. 16 is a schematic view for explaining a state where the front wheels of the vehicle to be measured are rolled leftward when using the suspension rolling tester.

Further, as shown in FIG. 16, the front roll rigidity $K_F$ of the front wheels is calculated when the vehicle is rolled leftward by rolling the vehicle by 2°. An average front roll rigidity is calculated from these roll rigidities when the vehicle is rolled rightward and leftward.

(2) The roll steering ratio (%value) of the right front wheel $H_{FR}$ is calculated by obtaining the average variation inclination of the values $r_1$ and $r_2$ (average roll steering angle $\theta_{FR}$) when the vehicle is rolled rightward and leftward, then dividing the average roll steeling angle $\theta_{FR}$ by the roll angle (2°), and multiplying the resultant divided value by 100.

Likewise, the roll steering ratio (%value) of the left front wheel $H_{FL}$ is calculated by obtaining the average variation inclination of the values $r_1$ and $r_2$ (average roll steering angle $\theta_{FL}$) when the vehicle is rolled rightward and leftward, then dividing the average roll steering angle $\theta_{FL}$ by the roll angle (2°), and multiplying the resultant divided value by 1002°

Figure 17:
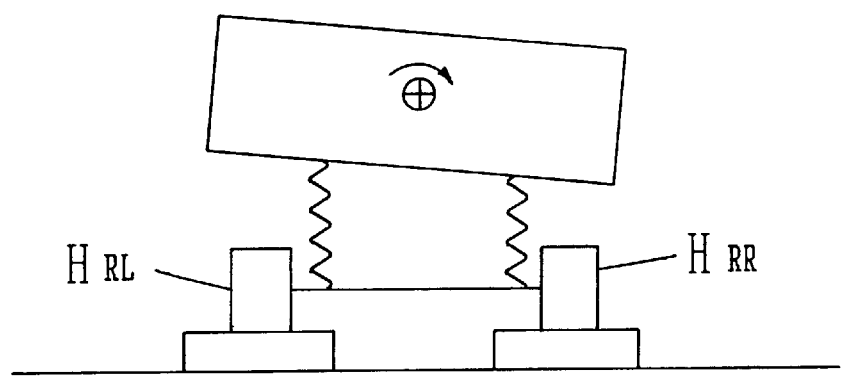
FIG. 17 is a schematic view for explaining a state where the rear wheels of the vehicle to be measured are rolled rightward when using the suspension rolling tester.

(3) Next, as for the rear wheels, as shown in FIG. 17, the front roll rigidity $K_R$ of the rear wheels is calculated when the vehicle is rolled rightward by rolling the vehicle by 2°.

Figure 18:
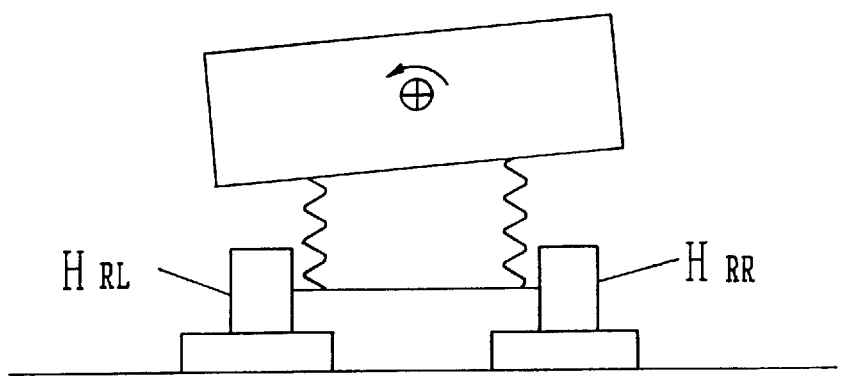
FIG. 18 is a schematic view for explaining a state where the rear wheels of the vehicle to be measured are rolled leftward when using the suspension rolling tester.

Further, as shown in FIG. 18, the rear roll rigidity $K_R$ of the rear wheels is calculated when the vehicle is rolled leftward by rolling the vehicle by 2°. An average front roll rigidity is calculated from these rear roll rigidities when the vehicle is rolled rightward and leftward.

(4) In such a manner, when the front roll rigidity $K_F$ and the rear roll rigidity $K_R$ are calculated, the front roll rigidity sharing ratio is calculated by the expression of the front roll rigidity $K_F$/ the total roll rigidity $K_F+K_R$. Likewise, the rear roll rigidity sharing ratio is calculated as the expression of the rear roll rigidity $K_R$/the total roll rigidity $K_F+K_R$.

(5) Further, the roll steering ratio (%value) of the right rear wheel $H_{RR}$ is calculated by obtaining the average (average roll steering angle $\theta_{RR}$) of the variation incli- nation of the values $r_1$ and $r_2$ when the rear wheels are rolled rightward and leftward, then the average roll steering angle $\theta_{RR}$ is divided by the roll angle (2°), and multiplying the resultant divided value by 100.

Likewise, the roll steering ratio (%value) of the left rear wheel $H_{RL}$ is calculated by obtaining the average (average roll steering angle $\theta_{RL}$) of the variation inclination of the values $r_1$ and $r_2$ when the rear wheels are rolled rightward and leftward, then the average roll steering angle $\theta_{RL}$ is divided by the roll angle (2°), and multiplying the resultant divided value by 100.

Two wired type alignment variation sensors 24 and 24 are positioned to confront each other at two points in the vertical direction of the wheels to be measured, and the wires 24a and 24a are brought into contact with the attachment holder 31, so that a camber angle at the rolling time can be measured.

Accordingly, the two wired type alignment variation sensors 24 and 24 for measuring the toe angle shown in FIG. 13, may be structured as a rotary mechanism which can be used horizontally and vertically, if need be, for measuring both the toe angle and the camber angle.

Although a pair of elevating platforms 13 and 13 are driven interlockingly by way of the piping system serving as the elevating platform control part 14 according to the embodiment as set forth above, this invention is not limited thereto, for example, the pair of elevating platforms 13 and 13 may be independent of each other so as to be electrically controlled.

According to the suspension rolling tester of this invention, the following excellent effects are obtained.

(1) First of all, since the vehicle can be simply conveyed to the tester portion so as to be measured while it is not fixed to the tester portion, i.e., in a non-restricted state (free state), the invention dispenses with a troublesome operation for fixing the vehicle to the tester potion, thereby enabling a quick measurement.

Since there is no fixing means, there is no fear that the vehicle will be damaged or deformed.

(2) Since one pair of wheels (e.g. front wheels) are measured and another pair of wheels (e.g. rear wheels) are not measured according to the suspension rolling tester of this invention, a pair of roll input devices and a pair of measuring devices can perform such a measurement. If all four wheels are to be measured, the test or measurement can be performed by simply changing the direction of the vehicle in the garage.

(3) Since in the present system for applying the rolling force to the wheels not to be measured during the measurement of the wheels, an external additional force other than the rolling force to be transmitted from the wheels not to be measured is not applied to the wheels to be measured, more accurate measurement can be performed.

(4) It is possible to provide the roll input device at very low cost if: the roll input device comprises the elevating means such as a jack (garage jack or air jack) which is needed in any event in the garage, the elevating platforms on which the wheels are placed are composed of simply structured cylinders,; and the elevating platform control part which interlocks with and controls the two elevating platforms is composed of a piping system formed by a mere hose.

Further, the roll input device of this invention can be installed directly on the floor of the garage and thus dispenses with a pit which is formed by digging the earth, and hence it becomes economical since the rolling angle to be applied to the wheels is about 2° and a large elevating space is not required. Even if the roll input device is embedded into the pit, it can be embedded shallow pit, and hence the embedding of the roll input device becomes economical.

(5) It is possible to provide simple structured measuring devices at a low cost since the measuring devices of this invention may be formed by frame bodies having placing platforms capable of placing the wheels to be measured thereon except the wheel load meter and the distance sensor.

Further, since it is sufficient to have each measuring device have a size capable of placing the wheels to be measured thereon, the large space or the height thereof is not needed, and each measuring device is very convenient since it can be moved when it is not used.

(6) It is a matter of course that the load movement sharing ratio, the roll rigidity sharing ratio, the toe angle and camber angle of the wheels to be measured, and the roll steering ratio can be respectively calculated by performing an arithmetic operation of the measured data obtained by the measuring device. Based on these measured values, it is possible to accurately detect defects of balance of the roll rigidity and the alignment of movement in the suspension of the vehicle to be measured.

(7) That is, the suspension rolling tester of this invention having the above mentioned structure is the most suitable for a small scaled garage and can easily adjust the suspensions of the vehicle in an excellent condition (normal condition), thereby securing the safe traveling of the vehicle.

What is claimed is:

1. An apparatus for testing a vehicle suspension located on a vehicle having a body, a first pair of wheels operatively connected to one another by a first vehicle axle, and a second pair of wheels operatively connected to one another by second vehicle axle, the vehicle having a longitudinal axis which extends transverse to the axles, said apparatus comprising:

means for rotating the vehicle body and solely the first pair of wheels of the vehicle about the longitudinal vehicle axis to simulate vehicle roll during cornering at the second pair of wheels; and means for measuring suspension characteristics solely of the second pair of wheels of the vehicle during rotation of the first pair of wheels about the longitudinal vehicle axis.

2. The apparatus of claim 1, wherein said rotating means comprises:

elevating means offset to one side of the longitudinal vehicle axis for engaging and elevating the vehicle body to rotate the first pair of wheels about the longitudinal vehicle axis;

a pair of platforms, each said platform supporting one of the wheels of the first pair of wheels; and a controller for raising one of said platforms and lowering the other of said platforms upon elevation of the vehicle body by said elevating means.

3. The apparatus of claim 2, wherein said controller comprises a piston cylinder unit disposed between each said platform and a stationary support, said piston cylinder unit comprising a cylinder defining a fluid chamber therein and a piston movably disposed within said fluid chamber, and a conduit for fluidly connecting said fluid chambers of said piston cylinder units to one another.

4. The apparatus of claim 2, wherein said measuring means comprises a wheel load meter associated with each wheel of the second pair of wheels and alignment measuring means associated with each wheel of the second pair of wheels for measuring alignment variation of the second pair of wheels.

5. The apparatus of claim 4, further comprising a pair of frames, each of said frames including a table for supporting one of the wheels of the second pair of wheels, each of said wheel load meters being mounted on one of said frames adjacent a corresponding one of said tables.

6. The apparatus of claim 4, further comprising means for calculating suspension parameters of the second pair of wheels, said calculating means being configured to accept input from said wheel load meters and said alignment measuring means and to output a plurality of suspension parameters.

7. The apparatus of claim 2, wherein said elevating means comprises a vehicle jack.

8. An apparatus for testing a vehicle suspension located on a vehicle having a body, a first pair of wheels operatively connected to one another by a first vehicle axle and a second pair of wheels operatively connected to one another by a second vehicle axle, the vehicle having a longitudinal axis which extends transverse of the axles, said apparatus comprising:

a pair of vertically movable platforms, each of said platforms being configured for supporting one of the wheels of the first pair of wheels;

means for elevating one longitudinal side of the vehicle body and causing rotation of the vehicle body and the first pair of wheels about the longitudinal vehicle axis to simulate a cornering motion of the vehicle at the second pair of wheels;

a controller for raising one of said platforms relative to the other of said platforms in response to elevation of the one side of the vehicle body by said elevating means; and means for measuring load and alignment characteristics of the second pair of wheels of the vehicle during said cornering motion.

9. The apparatus of claim 8, wherein said controller comprises a piston cylinder unit disposed between each said platform and a stationary support, said piston cylinder unit comprising a cylinder defining a fluid chamber therein and a piston movably disposed within said fluid chamber, and a conduit fluidly connecting said fluid chambers of said piston-cylinder units to one another.

10. The apparatus of claim 8, wherein said measuring means comprises:

one of a laser displacement sensor and a wire displacement sensor associated with each wheel of the second pair of wheels for measuring alignment variation between the wheels of the second pair of wheels; and a load cell associated with each wheel of the second pair of wheels for measuring wheel load of the second pair of wheels.

11. The apparatus of claim 10, further comprising a pair of frames, each of said frames including a table for supporting one of the wheels of the second pair of wheels, each of said load cells being mounted at one of said frames adjacent a corresponding one of said tables.

12. The apparatus of claim 8, wherein said elevating means comprises a vehicle jack.

13. The apparatus of claim 8, wherein said controller is configured for raising said one of said platforms and lowering the other of said platforms in response to elevation of the one side of the vehicle body by said elevating means.

14. A method of testing a suspension located on a vehicle having a body, a first pair of wheels connected to one another by a first vehicle axle and a second pair of wheels connected to one another by a second vehicle axle, the vehicle having a longitudinal axis which extends transverse to the axles, said method comprising the steps of:

positioning the first pair of wheels of the vehicle on a pair of vertically movable platforms:

elevating one longitudinal side of the vehicle to effect rotation of the vehicle body and solely the first pair of wheels about the longitudinal vehicle axis to simulate a cornering motion of the vehicle at the second pair of wheels;

lowering one of the platforms and its corresponding wheel and raising the other of the platforms and its corresponding wheel responsive to said step of elevating; and measuring load and alignment characteristics solely of each of the wheels of the second pair of wheels during said step of elevating.

15. The method of claim 14, wherein said step of measuring comprises measuring load and alignment characteristics of the second pair of wheels while the vehicle is in a non-restricted state.

16. The method of claim 14, wherein said step of measuring comprises:

measuring alignment characteristics of each of the wheels of the second pair of wheels with one of a laser displacement sensor and a wire displacement sensor; and measuring the load of each of the wheels of the second pair of wheels with a load cell.

17. The method of claim 14, wherein said step of elevating comprises elevating one longitudinal side of the vehicle with a vehicle jack.

18. The method of claim 14, wherein the controller comprises a piston cylinder unit disposed between each platform and a stationary support, the piston cylinder unit comprising a cylinder defining a fluid chamber therein and a piston movably disposed within the fluid chamber, and a conduit fluidly connecting the chambers of the piston cylinder units to one another; and said step of lowering and raising comprises lowering one of the platforms and the wheel disposed thereon by forcing fluid out of its corresponding chamber and into the conduit with its corresponding piston and raising the other of the platforms and the wheel disposed thereon by forcing fluid from the conduit into its corresponding chamber.

19. The method of claim 14, further comprising calculating a plurality of suspension parameters based on the load and alignment characteristics obtained during said step of measuring.

* * * * *